M. W. WISMER.
COLLAR BUTTON.
APPLICATION FILED JUNE 21, 1911.
1,093,752.
Patented Apr. 21, 1914.
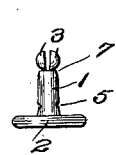 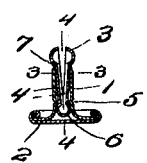 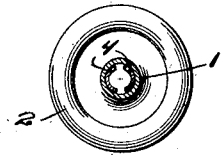
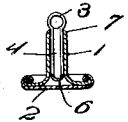 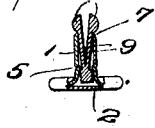 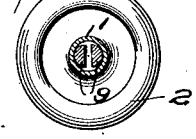
Inventor
Michael W. Wismer
Witnesses
H. Strauss
R. N. Krenkel
By Joshua R. H. Potts.
Attorney

UNITED STATES PATENT OFFICE.

MICHAEL W. WISMER, OF DOYLESTOWN, PENNSYLVANIA.

COLLAR-BUTTON.

1,093,752.

Specification of Letters Patent. Patented Apr. 21, 1914.

Application filed June 21, 1911. Serial No. 634,552.

*To all whom it may concern:*

Be it known that I, MICHAEL W. WISMER, a citizen of the United States, residing at Doylestown, in the county of Bucks and State of Pennsylvania, have invented certain new and useful Improvements in Collar-Buttons, of which the following is a specification.

My invention relates to improvements in collar buttons, the object of the invention being to provide a collar button having an expansible head, whereby the head of the button will be contracted when forced through a button-hole, and will expand after being forced through the button-hole to secure the parts together.

Heretofore collar buttons have uniformly been made either with a fixed or pivoted head, and the former make it difficult to attach the collar, while the latter soon get out of order, and in any event require the employment of an elongated button-hole.

At the present time, collars are being made with round button-holes, and such button-holes render it difficult to secure the same to a collar by the employment of an ordinary button, and to provide a button which is especially designed for use with round button-holes is the primary object of my invention, and it will now be described in detail.

With these and other objects in view, the invention consists in certain novel features of construction and combinations and arrangements of parts, as will be more fully hereinafter described and pointed out in the claim.

In the accompanying drawings: Figure 1, is a view in side elevation illustrating my improvements. Fig. 2, is a view in longitudinal section of Fig. 1. Fig. 3, is an enlarged view in cross section on the line 3—3 of Fig. 2. Fig. 4, is a view in section on the line 4—4 of Fig. 2, and Figs. 5 and 6, are views similar to Figs. 2, and 3, but illustrating modifications.

In constructing my improved collar button, I employ a tubular shank 1, fixed to a base 2.

3, represents the expansible head of my improved button, and said head comprises two semi-spherical members which are integral with spring arms 4, and the latter are integral with each other, connected at their lower ends, and secured in shank 1 in any approved manner. One simple form is to crimp the shank at opposite sides as shown at 5.

In the construction shown in Figs. 1, 2, 3, and 4, the expansible head, and its integral arms are made from a single sheet metal blank, the heads 3, 3, being hollow, and the arms connected at their inner ends by a partial coil 6, which gives the desired elasticity to the head. The outer end of the tubular shank 5 is bent inwardly slightly as shown at 7 to form a smooth juncture with the head, and facilitate the forcing of the shank through a button-hole.

In the modification shown in Figs. 5 and 6, the head 8 and the arms 9 are integral, and are formed from a solid piece of spring metal, but the operation is exactly as in the form above described. With a button of this character, when the head is forced through a button-hole, it will contract, so that it will readily pass through the button-hole and the head will then expand so that it will hold the collar in place. A button having a head of this character not only renders the connecting of the collar to the shirt band a very easy and simple operation, but it securely holds the collar, and enables collars to be provided with round button-holes of relatively small size.

My improved button is adapted for use in connection with metal reinforced button-holes, but is also adapted for ordinary stitched button-holes, and of course is adapted for use in connection with wrist bands and other uses to which a collar button is ordinarily put.

My improved button is designed to be made of various metals such as commonly used in connection with collar buttons on the market. It may be of gold, gold filled, gold plated, or other precious or baser metals or materials.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

As a new article of manufacture, a collar button comprising an outer tubular shank having a flared end and a slightly tapered end, a base fixed to the flared end of said tubular shank, spring arms, curved in cross section in the arc of a circle secured within the tubular shank, and formed of a single piece of spring metal, said spring arms being permanently held in said tubular shank by crimping said tubular shank adjacent its lower extremity and the ends of said arms projecting beyond the tapered end of said shank and normally flared apart, and semispherical sections on the outer ends of said arms adapted when forced together to form a spherical head, and of a size when expanded appreciably greater in diameter than the diameter of said tubular shank, substantially as described.

In testimony whereof I have signed my name to this specification in the presence of two subscribing witnesses.

MICHAEL W. WISMER.

Witnesses:
C. R. NIGHTENGALE,
ISAAC J. VANARTSDALEN.

Copies of this patent may be obtained for five cents each, by addressing the "Commissioner of Patents, Washington, D. C."